(12) United States Patent
Messana et al.

(10) Patent No.: US 10,113,678 B2
(45) Date of Patent: Oct. 30, 2018

(54) QUICK-COUPLING SLIDING JOINTS

(71) Applicant: Roberto Messana, Porcia (Pordenone) (IT)

(72) Inventors: Roberto Messana, Porcia (IT); Alessandro Arnulfo, Capitola, CA (US)

(73) Assignee: Roberto Messana, Porcia, Province of Pordenone (IT)

( * ) Notice: Subject to any disclaimer, the term of this patent is extended or adjusted under 35 U.S.C. 154(b) by 166 days.

(21) Appl. No.: 15/279,478

(22) Filed: Sep. 29, 2016

(65) Prior Publication Data
US 2017/0089500 A1    Mar. 30, 2017

(30) Foreign Application Priority Data

Sep. 30, 2015    (IT) .................. 102015000056741

(51) Int. Cl.
*F16L 37/084*    (2006.01)
*F16L 37/091*    (2006.01)

(52) U.S. Cl.
CPC ....... *F16L 37/0841* (2013.01); *F16L 37/0915* (2016.05)

(58) Field of Classification Search
CPC .......................... F16L 37/0841; F16L 37/0915
See application file for complete search history.

(56) References Cited

U.S. PATENT DOCUMENTS

| | | | | |
|---|---|---|---|---|
| 5,348,354 A * | 9/1994 | Badoureaux | ............ | B25B 27/10 285/308 |
| 5,487,572 A * | 1/1996 | Combot-Courrau | ........................ | F16L 37/0915 285/308 |
| 7,530,606 B1 * | 5/2009 | Yang | ................... | F16L 37/0915 285/308 |

FOREIGN PATENT DOCUMENTS

| | | |
|---|---|---|
| DE | 8908670 U1 | 9/1989 |
| EP | 2202441 A1 | 9/2016 |
| FR | 2945606 A1 | 11/2010 |
| GB | 2294990 A | 5/1996 |

* cited by examiner

*Primary Examiner* — James M Hewitt, II
(74) *Attorney, Agent, or Firm* — Jacobacci & Partners (57) ABSTRACT

Sliding quick-coupling joints are provided. Such joints have a tubular coupling element, in which an inner duct extends. The inner duct has a cylindrical chamber with an open end, an intermediate cylindrical section narrower than the cylindrical chamber, a central duct section, an inner transverse shoulder surface which connects the intermediate cylindrical section to the central section of duct, and a transverse surface that connects the cylindrical chamber and the intermediate cylindrical section. The cylindrical chamber accommodates a slidably movable annular locking element, a movable shoulder, and a sealing device. A pipe may be inserted into the cylindrical chamber and through these elements. The annular locking element is interposed between the transverse surface and the movable shoulder. The joint keeps the pipe mechanically coupled while providing fluid-tight seal and allowing the pipe to undergo thermal expansion. Methods of mounting such sliding quick-coupling joints are also provided.

13 Claims, 6 Drawing Sheets

QUICK-COUPLING SLIDING JOINTS

CROSS-REFERENCE TO RELATED APPLICATION

This application claims priority to and benefit of Italian Patent Application No. 102015000056741 filed Sep. 30, 2015, the contents of which are incorporated by reference in its entirety.

FIELD OF THE INVENTION

The present invention relates to joints for pipes. In particular, the present invention concerns sliding quick-coupling joints and methods of mounting such joints.

BACKGROUND OF THE INVENTION

Conventional joints, used to connect one or more pipes, usually have the disadvantage of not being able to provide an adequate sealing force to withstand axially-oriented stresses.

In particular, in the presence of a thermal exchange with a conveyed fluid, the pipes may be affected by deformation (in the form of, for example, elongations or shortenings) along the axial direction. Conventionally, these deformations are not compensated by a joint. For example, conventional threaded or flanged joints are rigid types of connections, and do not allow the pipe to deform freely in the vicinity of the junction area. In this way, the pipe is forced not to deform, and will transmit the entire stress on the joint.

To obviate this drawback, it is known to leave the pipe partially free to slide within the joint. An example of a coupling configured in the above manner is disclosed in patent publication EP 2 202 441.

The above document describes that inside a joint a cylindrical chamber can be formed which slidably receives an annular sleeve. The sleeve is provided with mutually opposite cylindrical walls, between which one end of the pipe is locked. An annular clamp is arranged in a radially retracted position, which clamps the pipe to prevent it from slipping out of the sleeve.

However, a solution of the aforementioned type is affected by the lack of a sufficient mechanical seal between the sleeve and the pipe, despite the presence of the annular clamp. In fact, when the pipe is subjected to considerable axial deformation, the connection between the sleeve and the pipe is ensured solely by pressure forces. Consequently, if a sufficiently strong axial force is applied, neither the pressure force exerted by the interlocking sleeve, nor the containing action of the annular clamp are sufficient to prevent the pipe from being pulled out of the joint.

SUMMARY OF THE INVENTION

The present invention provides joints capable of providing a stronger mechanical coupling with respect to conventional joints, in addition to ensuring a more efficient hydraulic sealing action even in the event of axial deformation of the pipe.

The above and other objects and advantages are achieved, according to an aspect of the invention, by sliding quick-coupling joints having the features described and claimed herein and by mounting methods utilizing the same.

In summary, the above objects are achieved by sliding quick-coupling joints having a tubular coupling element, in which an inner duct extends. The inner duct has a cylindrical chamber with an open end, an intermediate cylindrical section narrower than the cylindrical chamber, a central duct section, an inner transverse shoulder surface which connects the intermediate cylindrical section to the central section of duct, and a transverse surface that connects the cylindrical chamber and the intermediate cylindrical section. The cylindrical chamber accommodates a slidably movable annular locking element, a movable shoulder, and a sealing device. A pipe may be inserted into the cylindrical chamber and through these elements. The annular locking element is interposed between the transverse surface and the movable shoulder. The joint keeps the pipe mechanically coupled while providing fluid-tight seal and allowing the pipe to undergo thermal expansion.

The constructional and functional features of embodiments of the invention relating to sliding quick-coupling joints will now be described, as well as methods of mounting such joints. Reference is made to the accompanying drawings briefly described below.

DETAILED DESCRIPTION

With reference to the figures, a sliding quick-coupling joint, designated as a whole by reference number 1, comprises an element or coupling portion 2 of generally tubular shape, elongated along a longitudinal axis x and having an end 4. An internal duct extends longitudinally through the tubular coupling element 2. The internal duct forms an enlarged cylindrical chamber 3, having a first diameter D1, which has an outwardly open end 6 at the end 4 of the coupling element 2, an intermediate cylindrical section 5, and a central duct section 7.

In the illustrated example, the intermediate cylindrical section has a second diameter D2 which is narrower than the diameter D1 of the cylindrical chamber 3. Furthermore, the central duct section 7 has a third diameter D3 which is narrower than the diameter D2 of the intermediate cylindrical section 5.

An inner transverse shoulder surface 8 connects the intermediate cylindrical section 5 to the central duct section 7. As intended here, terms and expressions indicating directions such as "transversal", "longitudinal", "axial", should be interpreted with reference to the direction in which the sliding joint 1 extends, i.e. the direction of the longitudinal axis x.

The cylindrical chamber 3 and the intermediate section 5 are connected by a transverse surface 9. The transverse surface 9 may have a double taper, according to two mutually inclined generatrix lines, with a radially outer conical surface 10 which tapers towards the front end 4 of the coupling element 2, and a radially inner conical surface 11 which tapers rearwardly towards the intermediate cylindrical section 5.

An annular locking element 12 is slidably received in the cylindrical chamber 3. The annular locking element 12 is adapted to engage and be secured to a pipe C, which does not form part of this invention. The annular locking element 12 conveniently may be made of sheet metal, for example steel or brass.

Figure 5:
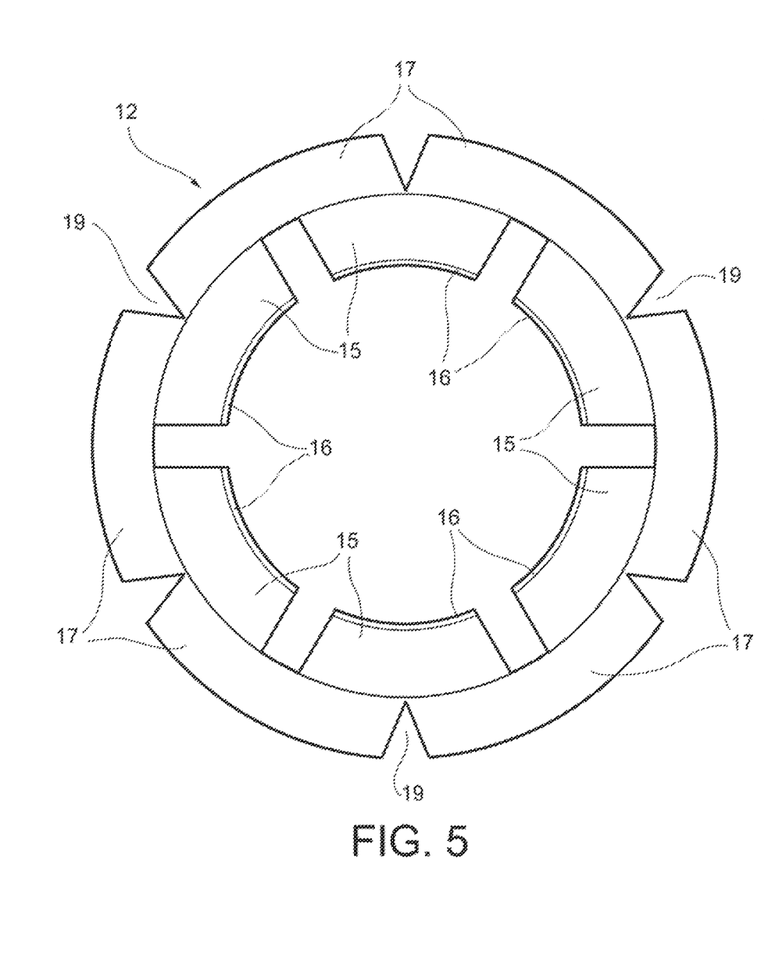
FIG. 5 is a front view of an annular locking element.
Figure 6:
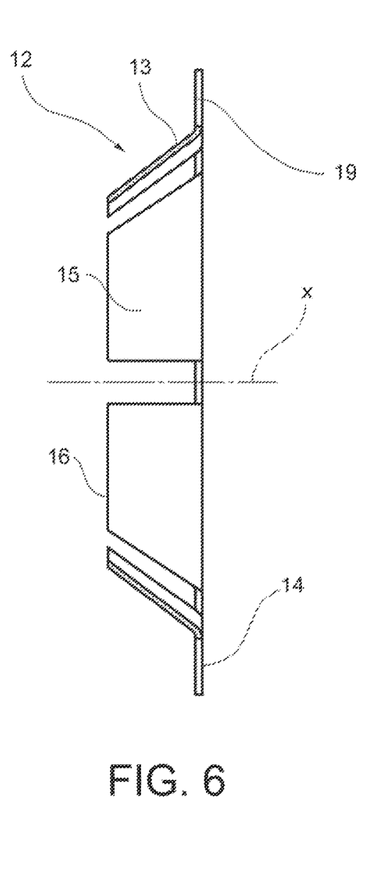
FIG. 6 is an axial cross-sectional view of the annular clamping element of FIG. 5.

In certain embodiments, as shown in FIGS. 5 and 6, the locking element 12 has a radially inner portion 13, which tapers substantially in accordance with a frusto-conical surface along an axial direction, and a radially outer portion 14 that extends along a plane which is inclined with respect to the radially inner portion 13. In these embodiments, the radially outer portion 14, in a first assembly step (which will be illustrated hereinafter) lies in a radial plane with respect to the cylindrical chamber 3.

In particular, according to the illustrated example, the radially inner portion 13 includes inner radially projecting engaging portions 15 having inner edges 16. The inner edges 16 may be curved and together define a diameter smaller than the diameter D2 of intermediate portion 5. Advantageously, as shown in FIG. 6, the diameter defined by the inner edges 16 is slightly narrower than the outer diameter of the pipe C, so that the insertion of the pipe C into the joint results in a slight elastic deformation of the inner radially projecting engaging portions 15 due to the engagement of the inner edges 16 on the pipe C.

The transverse surface 9 may have a slightly greater inclination than that of the portions 15 of the element 12, so as to allow a slight outward deflection when the pipe C is inserted.

According to certain embodiments, the inner edges 16 of the inner radially projecting engaging portions 15, have a sharp shape and/or have a sharp edge, so as to etch or cut into the outer surface of the pipe C.

The radially outer portion 14 of the locking element 12 has external tabs 17 which extend radially and are separated from one another by radial cuts 19 that allow the external tabs 17 to flex in axial or longitudinal planes.

The outer tabs 17 may have radially outer peripheral edges 18 which may be arcuate and together define a diameter substantially corresponding to the diameter D1 of the cylindrical chamber 3. A slight radial clearance may be provided between the outer peripheral edges 18 of the outer tabs 17 and the cylindrical chamber 3.

A shoulder 20 of annular shape is slidably received in the cylindrical chamber 3, and positioned in such a way that the annular locking element 12 is axially interposed between the transverse surface 9 and the movable shoulder 20.

The movable shoulder 20 has a movable abutment surface 21 that is directed toward the annular locking element 12. In the illustrated embodiment, the abutment surface 21 is congruent or substantially congruent to the annular locking element 12.

In certain embodiments, the abutment surface 21 has a double taper, according to two inclined generatrix lines, with a radially outer conical surface portion 22 which tapers towards the front end 4 of the coupling element 2, and a radially inner conical surface portion 23 which tapers rearwardly towards the intermediate cylindrical section 5.

The movable shoulder 20 forms a cylindrical central opening 24 having a diameter D2 corresponding to or greater than the diameter of the cylindrical intermediate portion 5.

In the illustrated example, a sealing device 25 for fluids includes a substantially cylindrical sleeve body which forms two or more adjacent annular or toroidal projections. The number and shape of the annular projections 25 of the sealing device are not to be construed as limiting.

The sealing device 25 includes elastic material, so as to exert the necessary sealing pressure. The sealing device 25 has an outer diameter which is slightly greater than the diameter D1 of the cylindrical chamber 3, and an inner diameter which is slightly shorter than the diameter D2 of the intermediate portion 5. In the drawings, the sealing device 25 is illustrated in a non-deformed condition.

A closure element 26 can be steadily coupled to the end 4 of the tubular coupling element 2, so as to occlude at least part of the end 6 of the cylindrical chamber 3.

In the specific embodiment illustrated, the closure element 26 is shaped as an annular cap which forms a cylindrical portion 27 firmly secured to the outer surface of the tubular coupling portion 2, and a transverse wall 28 which has a central circular opening 29 with a diameter corresponding to the diameter D2 of intermediate portion 5.

Methods of mounting a coupling on sliding quick-coupling joints according to an embodiment of the present invention will now be explained with reference to FIGS. 1 to 4.

In the following description, the term "front" designates a part of the sliding joint where the closure element 26 is arranged, while the term "rear" indicates the end portion axially opposite to the "front".

Figure 1:
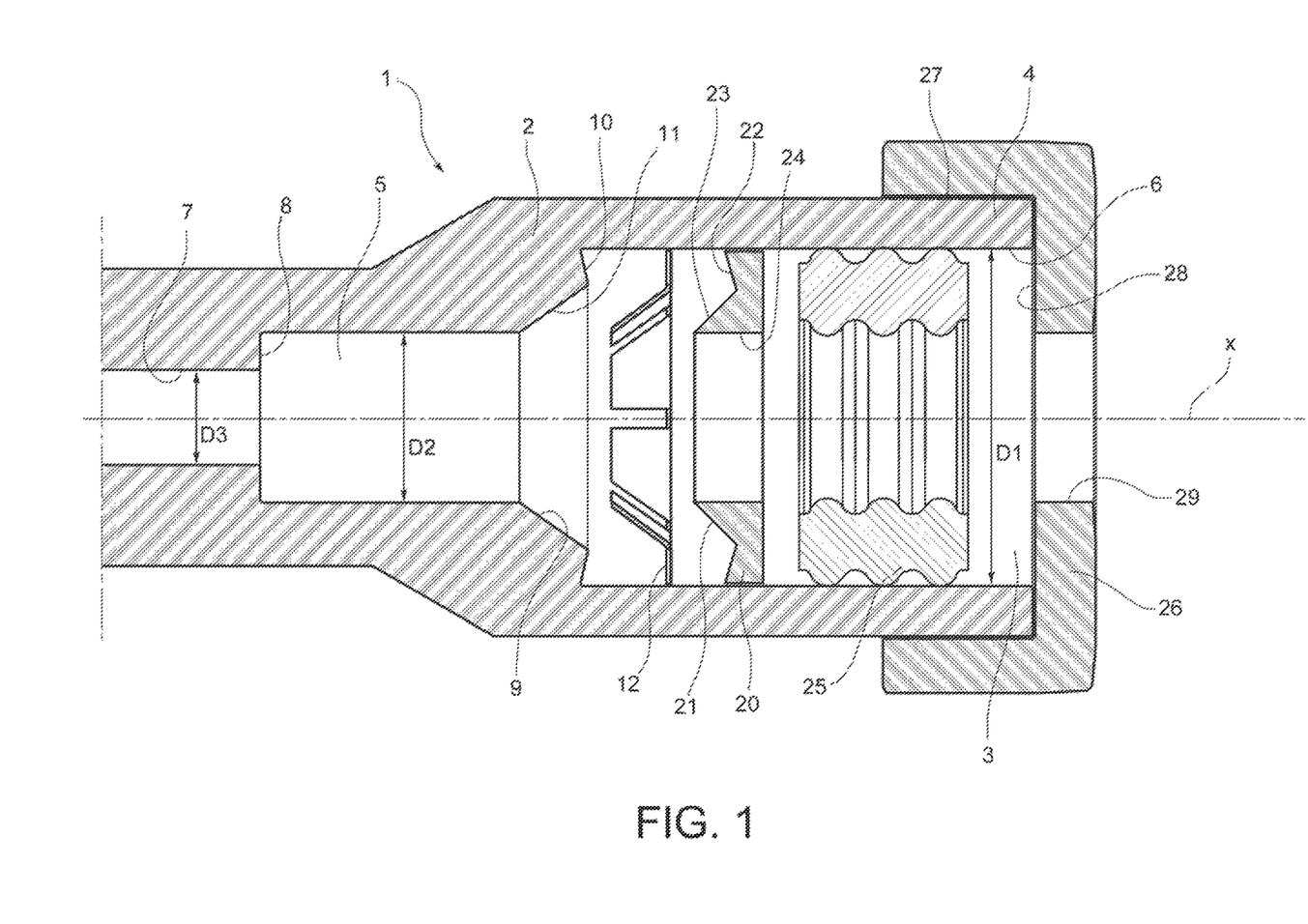
FIG. 1 is an axial cross-sectional view of a sliding quick-coupling joint during a first operating phase of the method, in accordance with an embodiment of the invention.

FIG. 1 illustrates a sliding quick-coupling joint 1 during a first operating phase. The locking element 12, the movable shoulder 20 and the sealing device 25 are successively inserted into the cylindrical chamber 3. The locking element 12 faces the transverse surface 9. The movable shoulder 20 is located adjacent to and in front of the locking element 12. The sealing device 25 is axially interposed between the movable shoulder 20 and the closure element 26, in particular the transverse wall 28.

The closure element 26 is securely mounted on the portion of the tubular coupling 2, so that the front end 6 of the cylindrical chamber 3 is partly occluded by the transverse wall 28 of the closing element 26.

Figure 2:
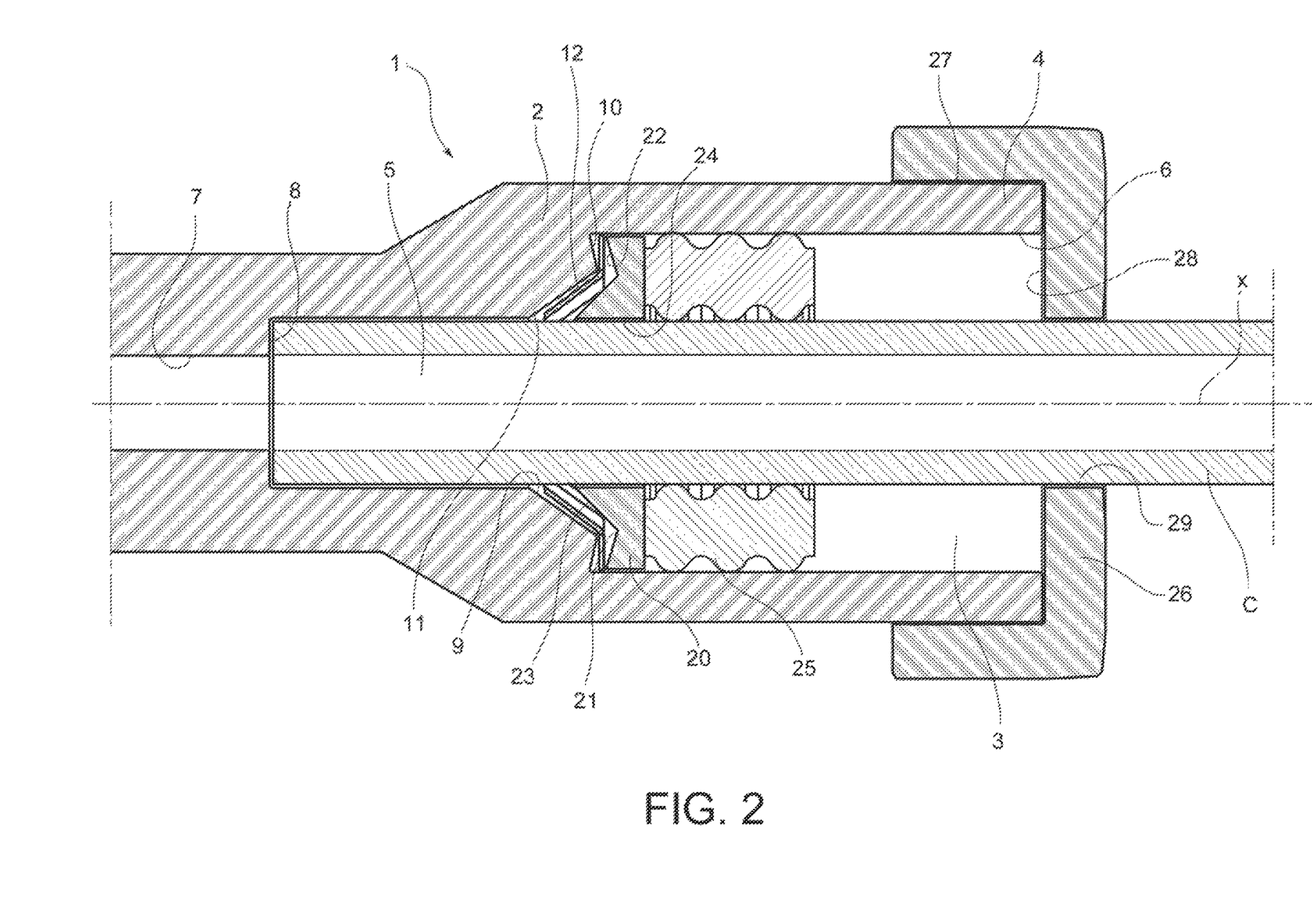
FIG. 2 is an axial cross sectional view of the joint of FIG. 1 during a second operating phase of the method.

FIG. 2 shows the sliding quick-coupling joint 1 during a second operating phase. The pipe C is conveniently inserted longitudinally from the front toward the rear side of the coupling by bringing the ends of the pipe in abutment against the transverse surface 8, in a condition of maximum penetration of the pipe into the joint.

The outer surface of the pipe C interferes radially with the locking 12 during the phase of insertion of the pipe C into the cylindrical chamber 3. The outer surface of the pipe also faces the intermediate portion 5, and is inserted through the radially inner surface 24 of the movable shoulder 20 and the sealing device 25.

Figure 3:
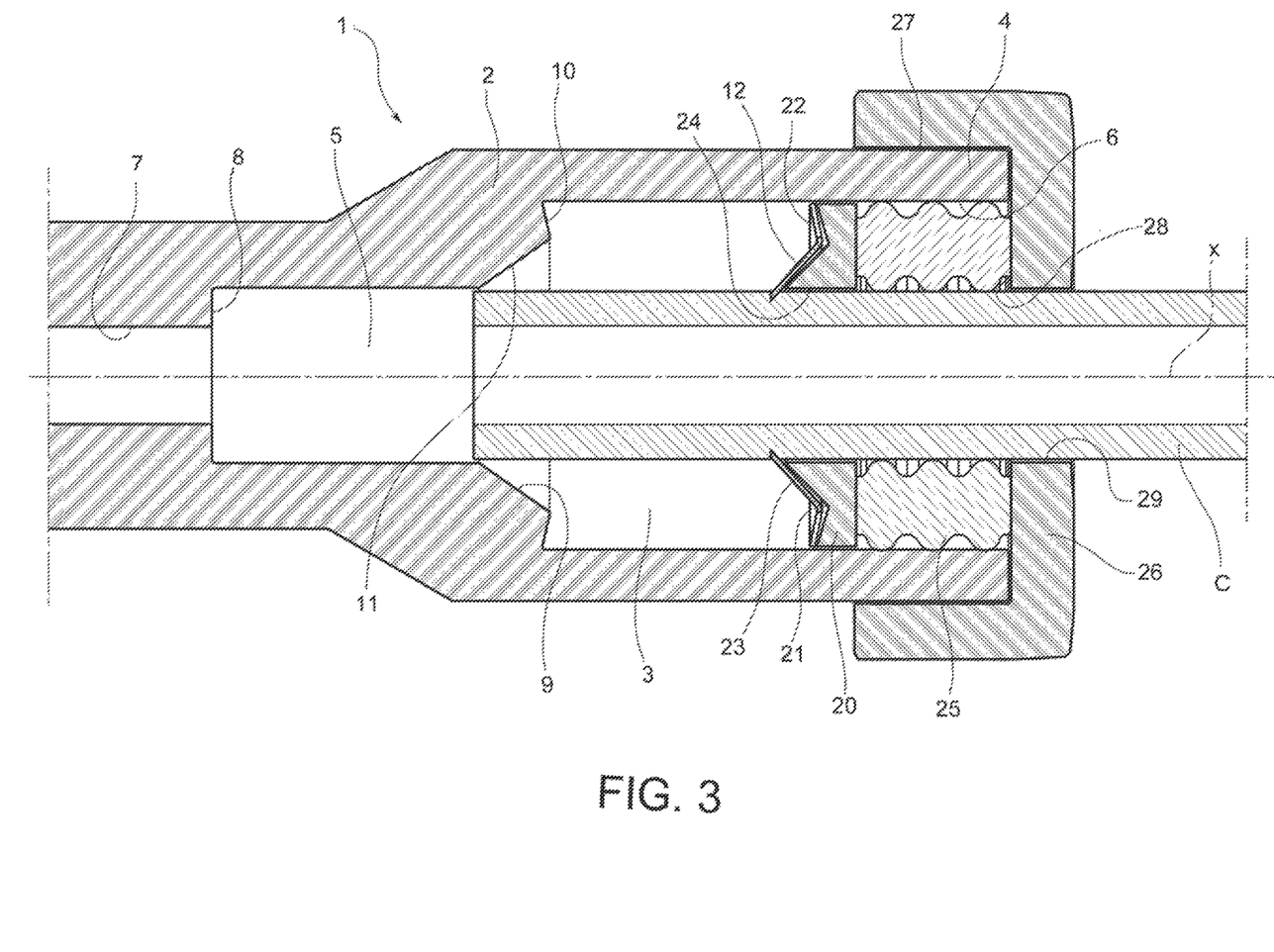
FIG. 3 is an axial cross sectional view of the joint of FIG. 1 during a third operating phase of the method.

FIG. 3 shows the sliding quick-coupling joint 1 during a third operating phase. In this phase, the pipe is pulled longitudinally toward the front of the joint. The locking element 12, due to the engagement of the inner radially protruding engaging portions 15 against the pipe C, is also pulled by the pipe in the longitudinal direction toward the front of the joint.

The locking element 12 also pulls the movable shoulder 20 and the sealing device 25 with it until the sealing device 25 comes into contact with the closure element 26. In the illustrated example, the sealing device comes in contact with the transverse wall 28.

Pulling the pipe C further out of the joint 1 will cause the locking element 12 to press the movable shoulder 20 in abutment against the sealing device 25. The tensile force F2 (FIG. 7) exerted by the pipe in the front direction (to the right in the drawings) pulls the inner radially projecting engaging portions 15 in an axially outward direction. In this phase, the movable shoulder exerts an action of axial contrast F1 along the outer edge which, due to the separation of the tabs 17, tends to overturn or rotate the locking element 12. In this step the locking element 12 acts like a lever and adapts itself to the adjacent surface of the movable shoulder. Particularly, the juxtaposition of the forces F1 and F2 generates a torque (indicated in FIG. 7 with a dotted line), which produces a rotation/bending of the locking element 12 around an annular fulcrum f. The outer edges of the outer fins are so urged in a radially outer direction against the cylindrical cavity 3. As a result, a force F3 is generated by the action of the couple of forces F1 and F2 around the annular fulcrum f. The forces F1 and F2 act respectively at the outer edge of the movable shoulder 20 and against the pipe C. The force F3 is concentrated on the pipe C that is made of a material softer than the metal of the locking element 12. In this way, the reaction force F3 causes the inner edges of the inner fins of the locking element 12 to penetrate the surface in the inclined direction (i) of the incision, opposing the extraction of the pipe from the joint.

Figure 7:
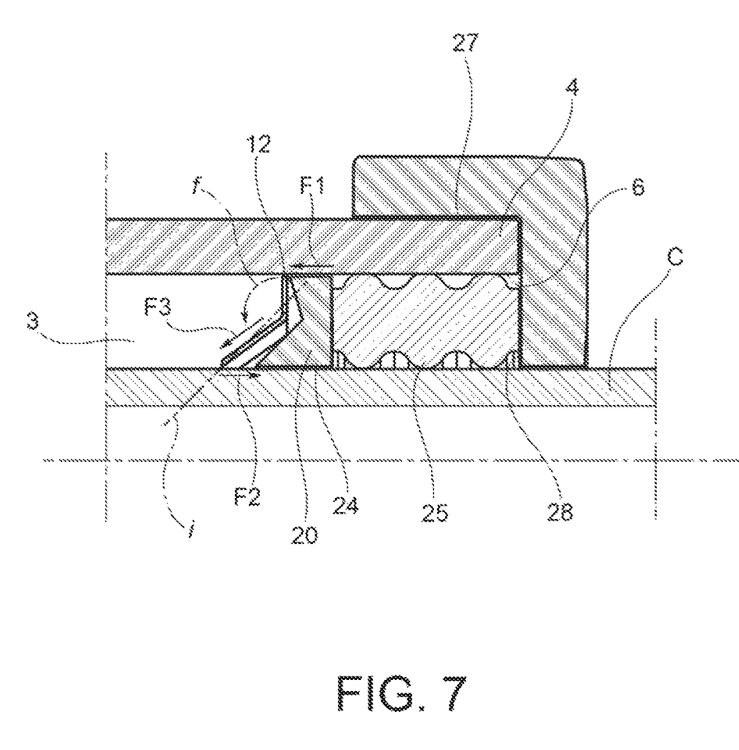
FIG. 7 is a partial axial cross-sectional view of the joint schematically showing the forces acting on the joint.

In other words, the pipe C is pulled further in the direction of extraction so that the thrust of the conical outer edge of the movable shoulder 20 on the edge of the radially outer tabs 17 will generate a centripetal thrust, rather than a tangential thrust, of the inner engaging portions 15 of the locking element 12. The inner engaging portions 15 will at least in part penetrate the pipe C, whereby the locking element remains integral with the pipe C.

The engagement of the internal tabs of the locking element 12 in the surface of the pipe C ensures a strong mechanical connection, preventing the pipe from being pulled out of the joint. The grip of the joint on the pipe increases progressively with the tensile force acting on the pipe.

Figure 4:
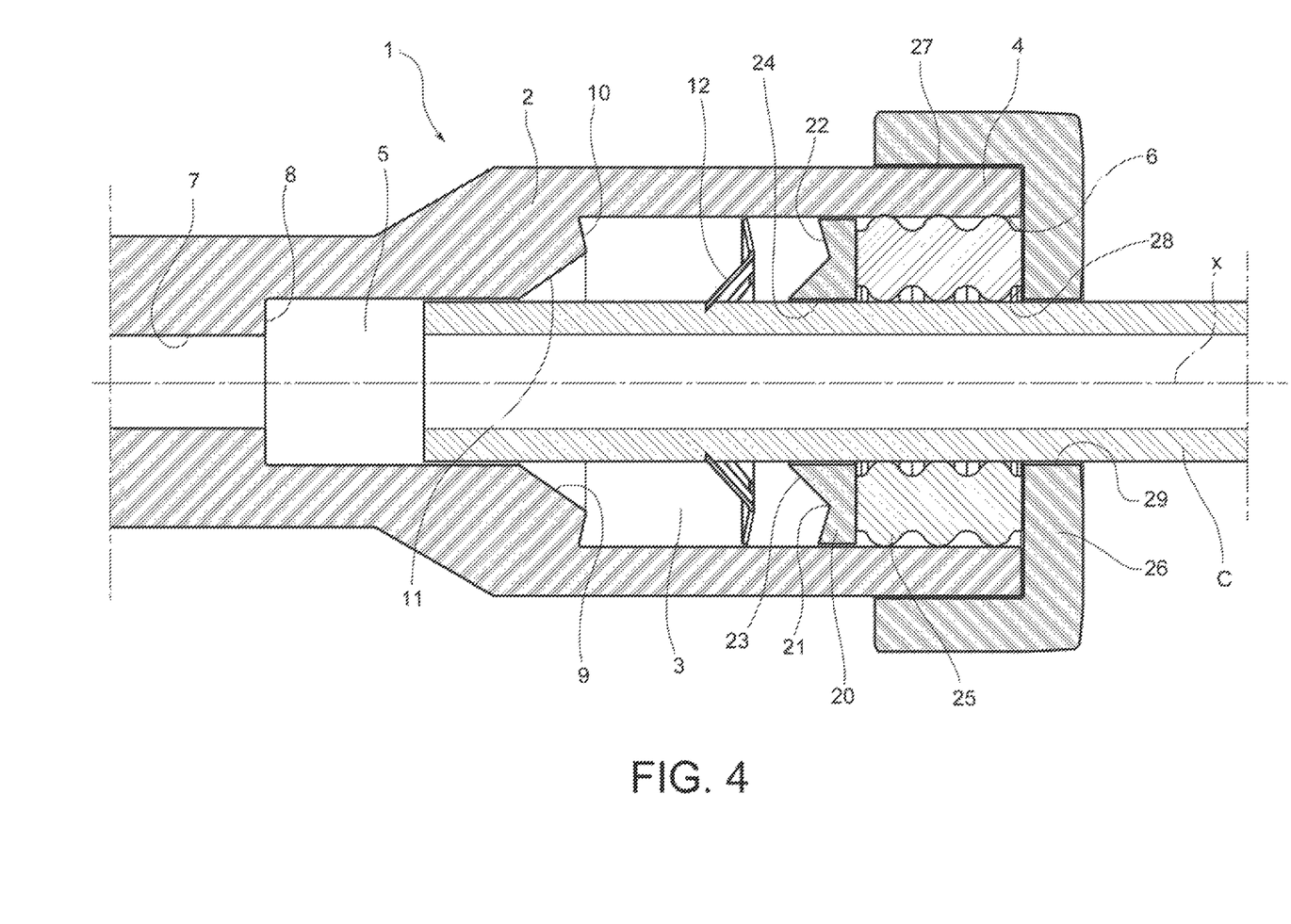
FIG. 4 is an axial cross sectional view of the joint of FIG. 1 during a fourth operating phase of the method.

FIG. 4 shows the sliding quick-coupling joint 1 during a fourth operating phase. In this 1 phase, the pipe C is pushed again in the longitudinal direction toward the rear of the joint 1, for example due to a thermal stress. The locking element 12, which is secured on the pipe, follows this movement. At the same time, the movable abutment and the sealing device remain in the vicinity of the closing element, not necessarily following the locking element.

The movable shoulder 20 may be substantially in contact with the outer surface of the pipe C and the inner surface of the chamber 3, thereby removing from the surface of the pipe impurities that accumulate on the pipe with time. This cleaning action is very useful and serves to ensure smooth movement functionality of the sealing device inside the joint.

In this phase, the pipe is allowed to move back and forth in the longitudinal direction, as a result of thermal stress or any mechanical stress.

In the condition of maximum penetration (FIG. 2), the pipe is abutted against the transverse surface of the internal abutment 8. The locking element 12 is located adjacent to or in contact with the transverse surface 9, but does not receive a meaningful thrust from this surface, and therefore it is not pulled off the pipe, since the action of abutment is transmitted from the pipe C against the internal abutment surface 8.

The maximum extension condition (FIG. 3), is determined by the locking element 12, which is integral with the pipe, and abuts against the movable shoulder. The movable shoulder is stopped by the locking element through the interposed sealing device.

A possible sharp extraction movement should not cause the locking element to come off of the pipe, by virtue of the damping effect given by the elastic properties of the sealing device 25, which is progressively compressed between the movable shoulder 20 and the transverse wall 28. The sleeve-like shape of the sealing device prevents it from rolling along the pipe and losing its sealing capability after prolonged use, due to the stress acting on the sealing device. The particular sleeve-like shape with annular corrugations side-by-side allows the sleeve to slide without coiling, while maintaining contact with both the inner pipe and the outer tubular coupling element.

Experimental tests carried out have shown that the locking element 12 can be removed from the pipe only if the movement of extraction is so great that it would be destructive for the pipe.

According to another embodiment (not shown), a second pipe may be coupled to the joint on the opposite side to that illustrated in the attached drawings, for example according to an arrangement substantially identical and symmetrical to the one illustrated herein, or according to a conventional coupling design with threads or flanges.

In a further, alternative embodiment (not shown), the intermediate cylindrical section 5 and the central portion of duct 7 have equal diameters. Between these two sections there may be an annular protrusion having a smaller diameter than that of the intermediate cylindrical section 5 and the central duct portion 7. Such an annular protrusion may act as an internal shoulder surface for the pipe C.

Advantageously, the sliding quick-coupling joint according to the invention is able to provide a stronger mechanical connection as compared to conventional joints, while ensuring an efficient hydraulic sealing action and allowing the joint to withstand elongations and shortenings due to thermal stresses.

The particular arrangement and combination of three internal components of the coupling (the locking element 12, the movable shoulder 20, and the sealing element 25) provides excellent results in terms of tightness and tensile strength, while allowing a wide range of thermal expansion. This makes the coupling ideal for joints between prefabricated radiant panels and, more generally, joints between pipes, in particular plastic pipes, which are subject to thermal expansions that cannot be compensated for without exerting excessively high forces on the sealing devices.

Several aspects and embodiments of the sliding quick-coupling joint and a method of mounting the same have been described. It is understood that each embodiment may be combined with any other embodiment. The invention, moreover, is not limited to the specific embodiments described herein, but may be varied somewhat while remaining within the scope defined by the appended claims.

What is claimed is:

1. A sliding quick-coupling joint, comprising:
    a tubular coupling element having an elongated shape, in which an inner duct extends longitudinally, the inner duct forming:
        a cylindrical chamber having a first diameter (D1), with one end open outwardly at one end of the coupling element;
        an intermediate cylindrical section having a second diameter (D2) narrower than the first diameter (D1);

a central duct section;

an inner transverse shoulder surface which connects the intermediate cylindrical section to the central duct section; and a transverse surface which connects the cylindrical chamber to the intermediate cylindrical section;

an annular movable shoulder slidingly received in the cylindrical chamber;

an annular locking element slidingly received in the cylindrical chamber and having radially protruding inner engagement portions defining together a diameter smaller than the second diameter (D2), the annular locking element being axially interposed between the transverse surface and the movable shoulder;

a closing element stably connectable to the end of the coupling tubular element, so as to occlude at least partly the end of the cylindrical chamber; and a fluid sealing device received in the cylindrical chamber.

2. The joint of claim 1, wherein the inner engagement portions extend according to a conical surface which tapers towards the intermediate cylindrical section.

3. The joint of claim 2, wherein the transverse surface has a radially outer conical surface portion which tapers frontwards toward said end of the coupling element.

4. The joint of claim 3, wherein the transverse surface has a radially inner conical surface portion which tapers rearwards toward the intermediate cylindrical section.

5. The joint of claim 1, wherein the locking element comprises metal sheet.

6. The joint of claim 1, wherein the transverse surface has a shape at least partly complementary to a contour of the annular locking element.

7. The joint of claim 1, wherein the radially protruding inner engagement portions are formed as a plurality of flexible tabs which are separated from one another by radial cuts.

8. The joint of claim 1, wherein the radially inner protruding engagement portions have sharp inner edges.

9. The joint of claim 1, wherein the locking element has a radially outer portion comprising a plurality of radially outer tabs which are separated from one another by radial cuts and which define together a radially outer diameter substantially corresponding to the diameter (D1) of the cylindrical chamber.

10. The joint of claim 4, wherein the movable shoulder has a rear face which is facing the locking element and has a double taper substantially congruent to the transverse surface, and wherein the radially inner conical surface portion of the transverse surface is tapered according to an angle which is smaller than an angle with which the conical surface of the radially protruding inner engagement portions is tapered, so as to allow the radially protruding inner engagement portions to deflect outwardly when a pipe (C) is inserted into the joint.

11. The joint of claim 1, wherein the fluid sealing device is interposed between the movable shoulder and the closing element.

12. The joint of claim 1, wherein the sealing device comprises a substantially cylindrical sleeve-shaped body comprising resilient material forming two or more axially adjacent annular or toroidal protrusions.

13. A method of mounting a sliding quick-coupling joint of claim 1 comprising the steps of:

a) consecutively inserting the locking element into the cylindrical chamber, then the movable shoulder, and then the fluid sealing device;

b) stably coupling the closing element to the tubular coupling element;

c) inserting a pipe (C) within the tubular coupling element, so that the inner edges of the locking element come into contact with an outer surface of said pipe;

d) pulling the pipe (C) in an axial direction opposite to the insertion direction of step a), until the pipe (C), the locking element, the movable shoulder and the fluid sealing device come to a stop with the fluid sealing device abutting against the closing element; and e) further pulling the pipe (C) in the extraction direction of step d) so as to force the inner engagement portions of the locking element to at least partly penetrate the pipe (C), whereby the locking element remains integral with the pipe (C).

* * * * *